United States Patent
Poirier et al.

(10) Patent No.: US 6,457,589 B1
(45) Date of Patent: Oct. 1, 2002

(54) FLUID FILTRATION AND DISPENSING SYSTEM

(75) Inventors: Malcolm D. Poirier, Marietta; Jeffrey E. Fish, Dacula; Kevin P. McGrath; Bruce S. Williamson, both of Alpharetta, all of GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/512,490

(22) Filed: Feb. 24, 2000

(51) Int. Cl.[7] .............................................. B01D 27/08
(52) U.S. Cl. ..................... 210/459; 210/238; 210/282; 210/287; 210/433.1; 210/421; 210/422; 210/424; 210/435; 210/460; 210/463
(58) Field of Search ......................... 210/459–460, 210/463, 282, 237–238, 435, 232, 287, 424, 420, 449, 470, 418, 421, 422–423, 433.1; 222/189.06

(56) References Cited

U.S. PATENT DOCUMENTS

| | | |
|---|---|---|
| 2,773,601 A | 12/1956 | Keller et al. |
| 3,038,610 A | 6/1962 | Hetherington |
| 3,690,565 A | 9/1972 | Abos |
| 3,760,951 A | 9/1973 | Mansfield |
| 3,780,869 A | 12/1973 | Krongos |
| 3,789,991 A | 2/1974 | Krongos |
| 4,001,120 A | 1/1977 | Gelman et al. |
| 4,107,046 A | 8/1978 | Corder |
| 4,147,631 A | 4/1979 | Deines et al. |
| 4,172,796 A | 10/1979 | Corder |
| 4,187,986 A * | 2/1980 | Petrovic |
| 4,212,743 A | 7/1980 | Van Meter et al. |
| 4,536,290 A | 8/1985 | Bonazzo |
| 4,556,484 A | 12/1985 | Hunter et al. |
| 4,595,500 A | 6/1986 | Galbiati |
| 4,599,171 A | 7/1986 | Padilla et al. |
| 4,674,689 A | 6/1987 | Smith et al. |
| 4,686,037 A | 8/1987 | Lang |
| 4,770,768 A | 9/1988 | Lang |
| 4,863,103 A | 9/1989 | Gannaway |
| 4,895,651 A | 1/1990 | Middleton |
| 4,933,080 A | 6/1990 | Rundzaitis et al. |
| D311,768 S | 10/1990 | Woodruff |
| 4,980,056 A | 12/1990 | Norton |
| D313,643 S | 1/1991 | Luzenberg, Jr. |
| 5,017,286 A | 5/1991 | Heiligman |
| 5,045,198 A | 9/1991 | Norton |
| 5,108,606 A | 4/1992 | Maglio |
| 5,127,427 A | 7/1992 | Kajpust et al. |
| D328,942 S | 8/1992 | Igami et al. |
| 5,151,179 A | 9/1992 | Bach et al. |
| 5,192,427 A | 3/1993 | Eger et al. |
| 5,192,436 A * | 3/1993 | Sasaki et al. ............... 210/264 |
| 5,194,156 A | 3/1993 | Tomchak |
| 5,256,287 A | 10/1993 | Underwood |
| D342,986 S | 1/1994 | Kurth |
| 5,277,802 A | 1/1994 | Goodwin |
| 5,290,443 A | 3/1994 | Norton |
| 5,316,216 A | 5/1994 | Cammack et al. |
| D358,868 S | 5/1995 | Hembree et al. |
| 5,458,766 A | 10/1995 | Ehara et al. |
| D365,380 S | 12/1995 | Wilcock |
| 5,510,031 A | 4/1996 | Knauf, Jr. et al. |
| 5,525,214 A * | 6/1996 | Hembree et al. ............. 210/88 |
| 5,527,451 A * | 6/1996 | Hembree et al. ............. 210/88 |
| D373,173 S | 8/1996 | Valley et al. |
| D378,122 S | 2/1997 | Milrud et al. |

(List continued on next page.)

Primary Examiner—Matthew O. Savage
Assistant Examiner—Marianne Ocampo
(74) Attorney, Agent, or Firm—Dority & Manning, P.A.

(57) ABSTRACT

The present invention provides a fluid dispenser. The flow of either filter or unfiltered fluid may be selected by positioning an actuator that also contains the filter. Selection is accomplished by positioning the actuator within two planes that are not coincident, or by positioning the actuator along a single axis.

26 Claims, 7 Drawing Sheets

U.S. PATENT DOCUMENTS

| | | |
|---|---|---|
| RE35,667 E | 11/1997 | Heiligman |
| 5,699,832 A | 12/1997 | Burchard et al. |
| D392,023 S | 3/1998 | Milrud et al. |
| 5,744,033 A * | 4/1998 | Bertrand et al. ............ 210/282 |
| 5,833,849 A * | 11/1998 | Primdahl ................... 210/232 |
| D406,317 S | 3/1999 | Hill et al. |
| D409,721 S | 5/1999 | Burchard et al. |
| 5,928,504 A * | 7/1999 | Hembree et al. ............. 210/88 |
| D415,822 S | 10/1999 | Ouyoung |

* cited by examiner

FLUID FILTRATION AND DISPENSING SYSTEM

FIELD OF THE INVENTION

The present invention relates to a fluid filtration and dispensing system. More specifically, the present invention is directed to a filtered fluid dispenser that allows selection between the flow of filtered and unfiltered fluid by positioning an actuator that also serves to house a filter.

BACKGROUND OF THE INVENTION

Fluid filtration devices have been developed for applications not requiring the scale or volume needed by municipal or industrial applications. Such devices range from those located at the "point-of-use" (e.g., the spigot of a kitchen sink, gravity-flow dispensers such as water pitchers, and low-pressure dispensers such as sports bottles) to the generally bulkier "point-of-entry" units hidden from view within the plumbing of a home or office.

While a particular application may require the availability of both filtered and unfiltered liquid, current devices may not readily allow the user to select between filtered and unfiltered flow. For example, existing point-of-entry units generally provide filtered fluid to all points-of-use within a dwelling or building regardless of whether filtered fluid is needed at each location. Existing point-of-use systems provide filtered fluid at specific locations, but may not allow selection between filtered fluid and unfiltered fluid. Some point-of-use systems are installed at the end-of-tap of the faucet assembly provided with a conventional sink. However, these systems tend to be bulky and consume space needed for using the sink. Current end-of-tap systems are generally offset to the side of the tap and may require a large housing to contain the filter media. In addition to consuming needed sink space, these units may not be aesthetically acceptable to consumers.

Accordingly, a need exists for a filtered fluid dispensing system suitable in size and scale for residential or office use. In addition, a system is also needed that allows the user to select between filtered fluid and unfiltered fluid. Even more desirably, there exists a need for a filtered fluid dispensing system that saves space when used with the faucet assembly of a conventional sink.

SUMMARY OF THE INVENTION

Objects and advantages of the invention will be set forth in the following description, or may be gleaned from the description, or may be learned through practice of the invention.

The present invention is directed to a fluid filtering and dispensing system. More specifically, the present invention provides a fluid dispenser that allows selection between the flow of filtered and unfiltered fluid by positioning an actuator that also serves to house a filter. The system may also be resealably connectable to a conventional faucet assembly so as to allow for convenient selection of either filtered or unfiltered water flow. The actuator may be variously configured with a control valve that is, in turn, connectable to a conventional supply source, for example a conventional faucet, to provide a filtering fluid dispenser for such conventional supplies that occupies and operates within a minimum of space and can be conveniently located about the spigot to maximize the usable area available with a typical sink.

The dispensing system according to the present invention includes an unfiltered fluid inlet through which unfiltered fluid may be supplied to the dispensing system. Unfiltered fluid may exit the dispensing system through an unfiltered fluid outlet. A filtered fluid outlet is included, by which filtered fluid may exit the dispensing system. The unfiltered fluid inlet, unfiltered fluid outlet, and filtered fluid outlet are all in fluid communication with the control valve which is mechanically actuated by the actuator.

In one embodiment, the actuator is movable in a first plane of movement from a position wherein the control valve is closed to a position wherein unfiltered fluid is dispensed from the system. The actuator may be positionable to at least two positions in the first plane so that two different flow modes of unfiltered fluid may be dispensed from the system. The actuator is movable in a second plane of movement that may be, for example, perpendicular to the first plane of movement, to a position wherein the control valve is configured to direct filtered fluid from the system. The initiation and flow of fluid through the dispensing system is thus controlled by positioning the actuator within the first plane or within the second plane. By positioning the actuator, the valve may be manipulated so as to connect the unfiltered fluid inlet with either the unfiltered fluid outlet or the filtered fluid outlet.

A filter is located within the actuator so that in the filtered position of the actuator in the second plane, unfiltered fluid is directed through the actuator and is dispensed out of the filtered fluid outlet. The filter may be selected from a variety of filter media and construction methods depending upon the particular application.

Accordingly, an embodiment of a filtered fluid dispensing system operates as follows: An unfiltered fluid is supplied under pressure to the dispensing system. Upon rotating the actuator within the first plane so as to select the flow of unfiltered fluid from the dispensing system, unfiltered fluid enters the dispensing system through the unfiltered fluid inlet. The fluid then flows through the valve and exits the dispensing system through the unfiltered fluid outlet. The actuator may also be rotated within the second plane so as to select the flow of filtered fluid from the dispensing system. In this mode, unfiltered fluid enters the dispensing system through the unfiltered fluid inlet, flows through the valve, and flows through the filter located in the actuator. Filtered fluid flowing from the filter exits the dispensing system through the filtered fluid outlet.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

The actuator is also shown in dashed lines to indicate its operational position.

DETAILED DESCRIPTION OF THE PREFERRED EMBODIMENTS

Reference now will be made in detail to embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations.

As used herein, the words "faucet assembly" mean a conventional valve assembly installed in a conventional sink that generally includes a mixing base containing a cold water valve, a hot water valve, a spigot, a water sprayer connected to the mixing base of the faucet assembly by a flexible conduit, and a shuttle valve for directing the flow of water to the water sprayer when it is activated. For some faucet assemblies, the function of the cold water valve and hot water valve may be combined into a single valve. A faucet assembly could be used to dispense a fluid other than water. This definition and the present invention are not limited to water use only. Such conventional faucet assemblies are well known by those skilled in the art and a detailed description thereof is not necessary. Faucet assemblies will be described herein to the extent necessary to gain an appreciation and understanding of the invention.

A detailed description of the mechanical components and operation of embodiments of the dispensing system according to the invention is provided first followed by a detailed discussion related to suitable filter materials or media particularly useful in the present invention.

In general, the present invention relates to a system for filtering and dispensing fluid. More specifically, the present invention is directed to a fluid dispenser that allows selection between the flow of filtered and unfiltered fluid by positioning an actuator that also serves to house a filter. In certain embodiments, the present invention is also resealably connectable to a conventional faucet assembly so as to allow for the selection of either filtered or unfiltered water flow. While the background of the invention is presented in terms of water filtration, the present invention is not limited to water filtration and may be utilized in any application requiring a filtered fluid. Accordingly, the present invention is not limited to water filtration.

Figure 1A:
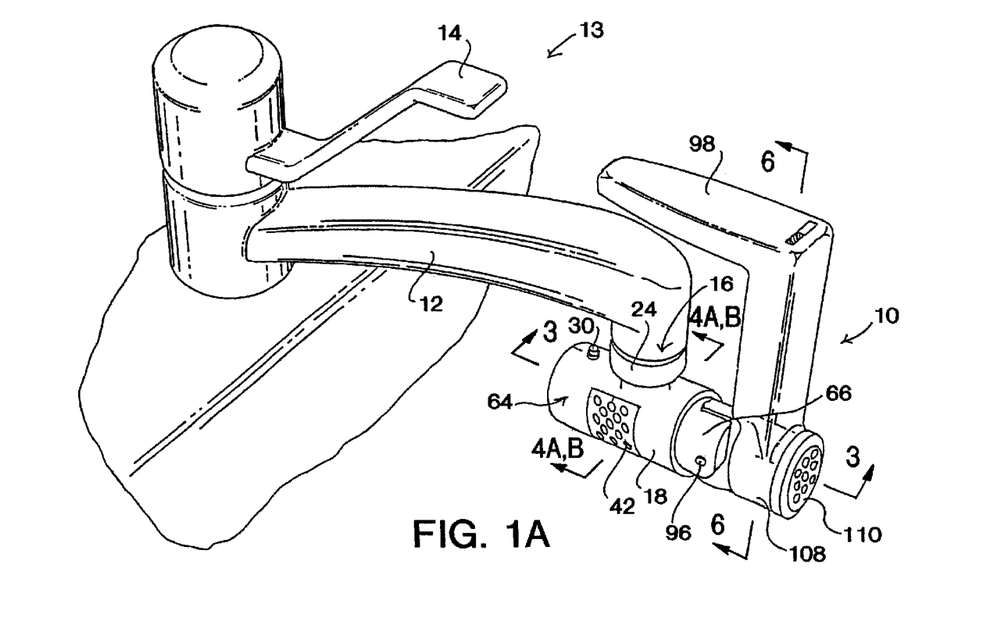
FIG. 1A is a perspective view of an embodiment of the present invention connected to a conventional faucet assembly.
Figure 1B:
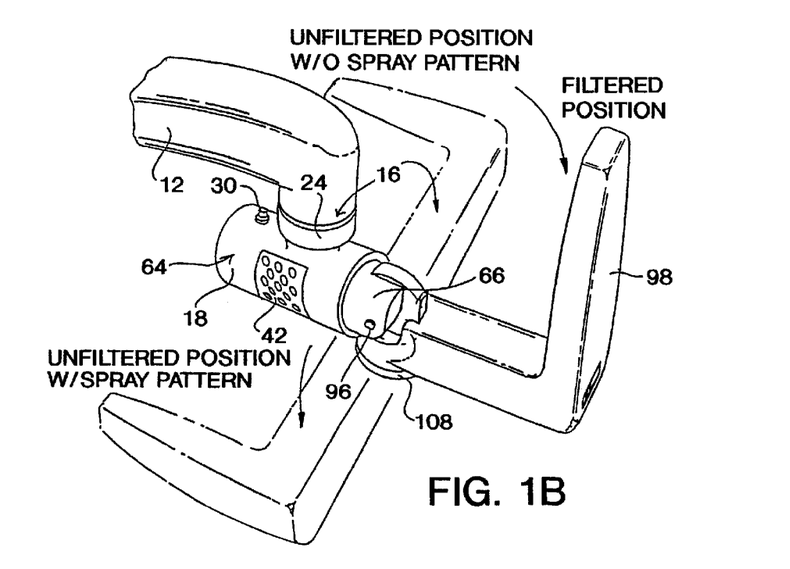
FIG. 1B is another perspective view of the embodiment depicted in FIG. 1A depicting the actuator in various positions.

Particular embodiments of the filtered fluid dispensing system according to the invention are illustrated in the figures. Certain features, such as seals and fluid pressure containment, are not shown or described in great detail as one skilled in the art could readily configure any number of variations thereof applicable to the present invention. Referring to FIGS. 1A and 1B, the dispensing system is designated generally as system 10 and is illustrated as connected to a conventional faucet assembly 13. A threaded connector 24 may be utilized to connect dispensing system 10 directly to spigot 12. In this connected condition, dispensing system 10 will have the configuration as depicted generally in FIG. 1A.

Dispensing system 10 includes an inlet through which unfiltered fluid is supplied to the system. As described in greater detail below, the inlet, designated generally as 16, defines a path into the interior of a valve 64. Dispensing system 10 incorporates an unfiltered fluid outlet through which fluid exits valve 64 without being filtered, and a filtered fluid outlet through which fluid exits the dispensing system after being filtered. The configuration and flow paths related to the filtered fluid outlet and unfiltered fluid outlet are discussed in greater below.

Valve 64 is a variably positionable valve that is selectively positioned by an operator to connect the inlet to a filter, or to connect the inlet with the unfiltered fluid outlet. Valve 64 is positioned by means of an actuator 98. Actuator 98 is positionable to at least one unfiltered dispensing position and to a filtered dispensing position. These dispensing positions are designated in FIG. 1B. The actuator is shown in a closed position in FIG. 1A. From this position, the actuator is moveable in a first plane of movement to either of the unfiltered positions shown in FIG. 1B. The actuator is also moveable from the closed position shown in FIG. 1A in a second plane of movement to the filtered position shown in FIG. 1B. Thus, in this embodiment, the first and second planes of movement are perpendicular to each other and the closed position is common to both planes. However, this is not a limitation of the invention and any distinct planes of movement may be used to position the actuator between the closed, filtered, and unfiltered positions.

Actuator 98 incorporates a filtering device or material therein such that the filtered fluid flow path is through valve 64, into actuator 98, through a filter contained in actuator 98, and out of system 10 through actuator 98. The configuration of the actuator and filter will be described in greater detail below with reference to particular figures.

Figure 2:
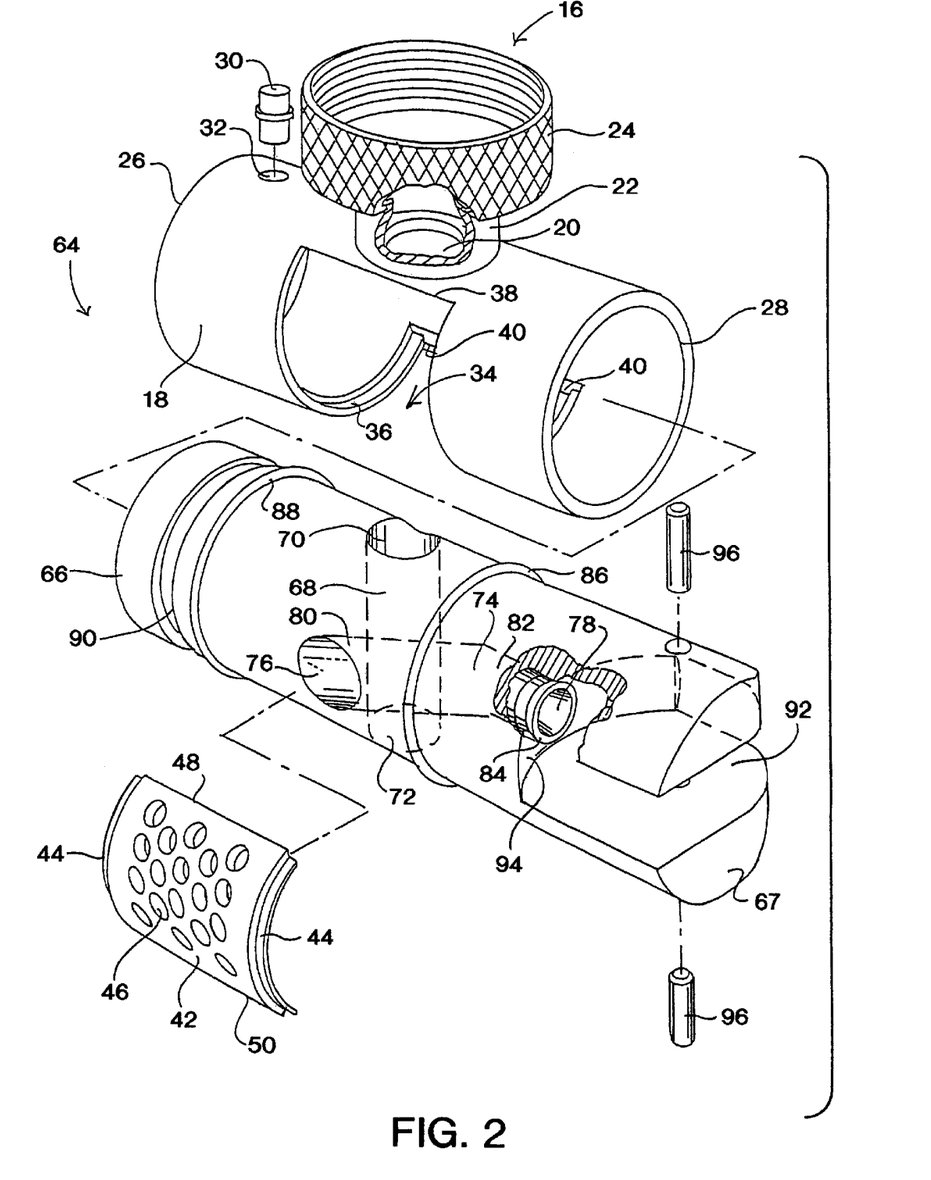
FIG. 2 is an exploded and partial cross-sectional view of components for the embodiment depicted in FIGS. 1A and 1B.

Valve 64 is shown in greater detail in FIGS. 2 through 5. Referring particularly to FIG. 2, valve 64 includes a valve housing 18 having a closed end 26 and an open end 28. Valve housing 18 may be a generally cylindrical member as illustrated in FIG. 2. Valve housing 18 is connectable to a source of fluid, such as a conventional spigot 12 (FIG. 1A). As mentioned, a threaded connection device 24 may be utilized for this purpose. An upstanding conduit 22 extends from threaded connector 24 to an inlet opening 20 defined in valve housing 18. Although not visible in the view of FIG. 2, an O-ring or other type seal may be configured with inlet opening 20 to seal against valve body 66. A circumferentially extending opening 34 is also defined in valve housing 18. Opening 34 is defined by ridges 36 and opposite ends 38, 40. Opening 34 cooperates with a diffuser plate 42 having side edges 44. Edges 44 slide along ridges 36 such that diffuser plate 42 is variably positionable along the circumferential length of opening 34.

Valve 64 also includes a generally cylindrically valve body 66. In the embodiment illustrated in FIGS. 1 through 8, valve body 66 is rotationally disposed within valve housing 18. A locking groove 90 is defined circumferentially around valve body 66. A lock pin 30 disposed through a hole 32 in valve housing 18 extends into this locking groove 90 to retain valve body 66 within valve housing 18. First and second o-ring type seals 86, 88 are disposed on valve body 66 to ensure a water tight seal between valve body 66 and valve housing 18.

An unfiltered passage 68 is defined through valve body 66. Unfiltered passage 68 is a generally straight conduit having a first end 70 and a second end 72. A passage 74 is also defined in valve body 66. Passage 74 has an inlet 76 and an outlet 78. Passage 74 is defined by a first portion 80 that is angled with respect to a longitudinally extending portion 82. Outlet 78 includes a sealing device 84. This sealing device may comprise any conventional seal, including a gasket material, a snap-in or push-in seal, etc. Sealing device 84 extends slightly beyond an arcuate surface 94 of a slot 92 defined in an end 67 of valve body 66, as particularly seen in FIG. 2. The function of seal 84 and arcuate surface 94 will be explained below.

Figure 3:
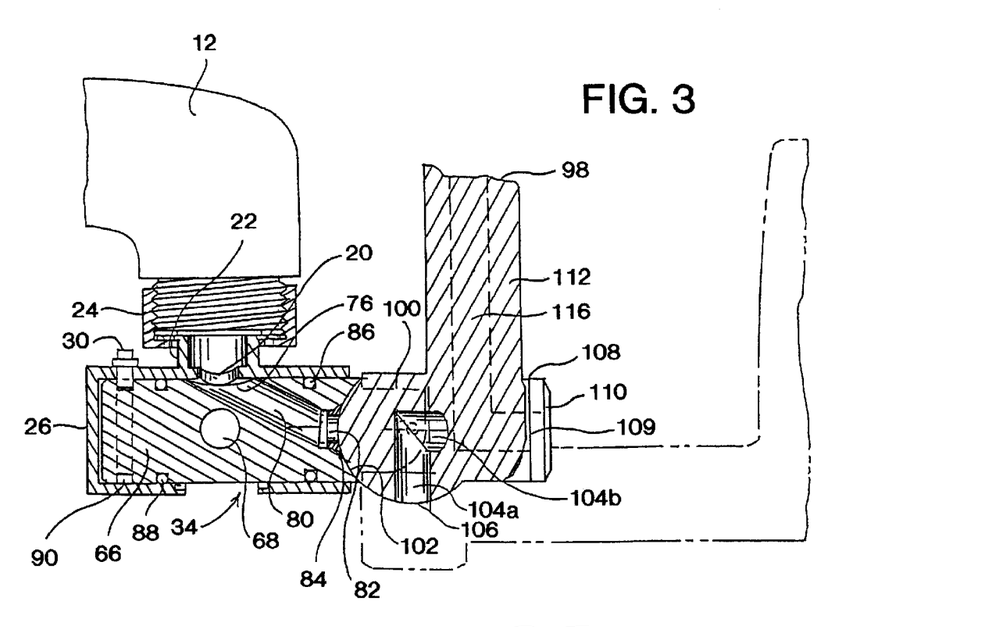
FIG. 3 is a cross-sectional view of the embodiment depicted in FIGS. 1A and 1B taken along line 3—3.
Figure 4A:
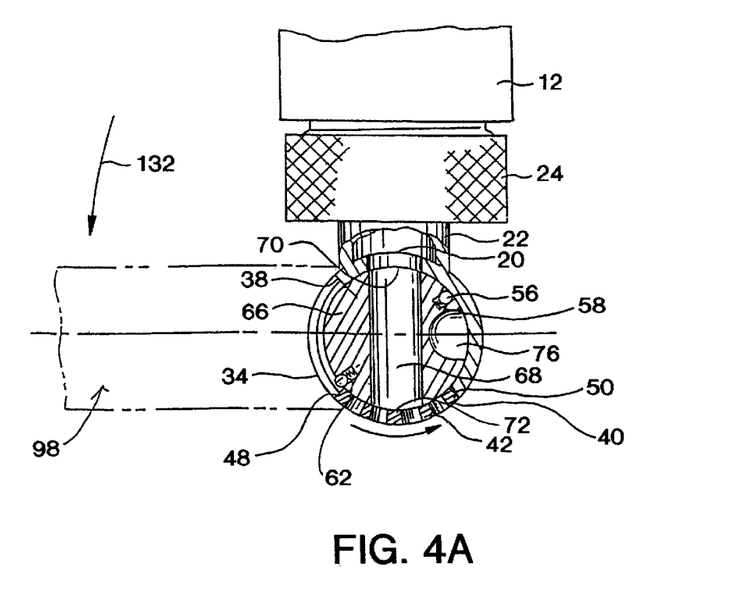
FIG. 4A is a partial cross-sectional view of the embodiment of FIG. 1 taken from the direction of line 4A,B—4A,B.
Figure 4B:
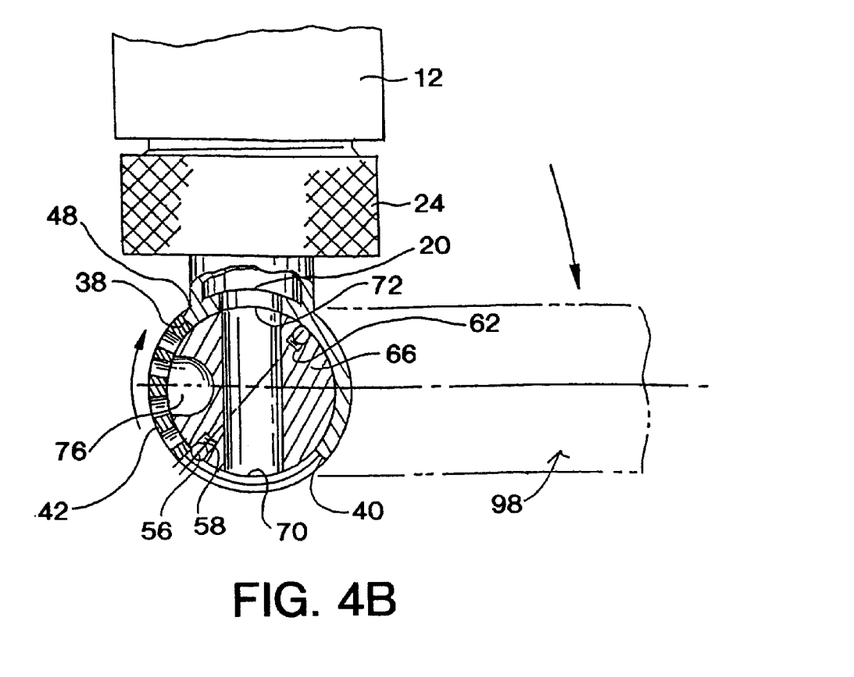
FIG. 4B is another partial cross-sectional view of the embodiment of FIG. 1 taken from the direction of line 4A,B—4A,B. The actuator is also shown in dashed lines to indicate its operational position.
Figure 5:
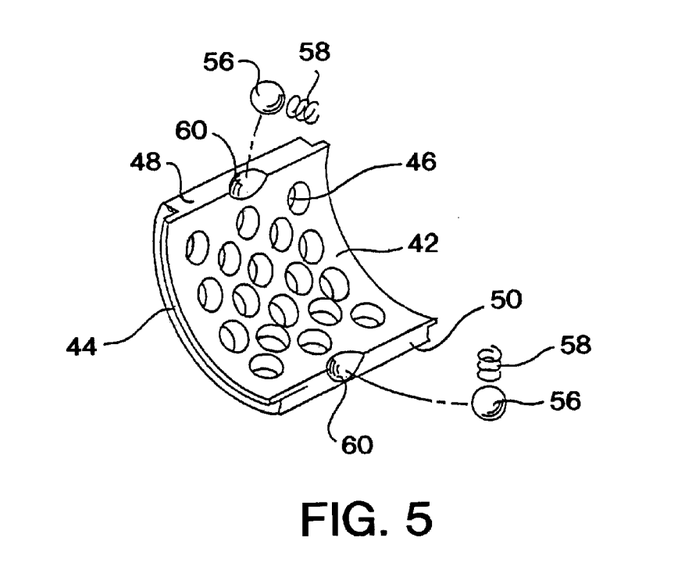
FIG. 5 is an exploded view of components for the embodiment depicted in FIGS. 1A and 1B.

As mentioned, a diffuser plate 42 having diffuser openings 46 defined therethrough is seated in valve housing 18 by means of edges 44 and plate ridges 36. Diffuser plate 42 is rotationally engaged with valve body 66 upon movement of actuator 98 from the closed position shown in FIG. 1A to the unfiltered position with spray pattern shown in FIG. 1B. Movement of actuator 98 in the first plane from the closed position to the unfiltered position without spray pattern shown in FIG. 1B rotationally disengages valve body 66 from diffuser plate 42. The rotational engagement is accomplished by means of a spring loaded ball and detent device. Referring particularly to FIGS. 4A, 4B, and 5, balls 56 are spring-loaded in recesses 62 defined in valve body 66 by way of springs 58. Any manner of conventional devices or resilient members may be used in place of springs 58 to impart a resilient force to balls 56. Balls 56 engage in detents 60 defined in the ends 48 and 50 of diffuser plate 42. In the closed position of actuator 98 illustrated in FIG. 1A, it can be seen that edge 48 of diffuser plate 42 abuts against end 38 of opening 34 defined in valve housing 18. Referring to FIG. 3, it can be seen that, in this alignment of actuator 98 and valve body 66, unfiltered passage 68 is misaligned with inlet 20 and is essentially perpendicular to the access of inlet 20. Upon movement of actuator 98 to the left as illustrated in FIG. 4A (to the unfiltered position with spray pattern illustrated in FIG. 1B), valve body 66 rotates within housing 18 and diffuser plate 42 rotates therewith because at least one of the balls 56 is engaged in one of the detents 60. The diffuser plate 42 will rotate until end 50 abuts against end 40 of valve housing 18. At this time, the engaging ball 56 will disengage upon further rotation of actuator 98. Upon movement of actuator 98 to the horizontal position illustrated in FIG. 4A, the opposite ball 56 will engage in opposite detent 60. Referring to FIG. 4A, it can be seen that in this configuration, diffuser plate 42 covers the bottom most portion of opening 34. Thus, when unfiltered fluid passes through unfiltered passage 68 and out end 72, the fluid will pass through the diffuser plate and define a spray pattern.

From the actuator position of FIG. 4A, the operator rotates actuator 98 back to the position of FIG. 1A (FIG. 3) to shut off the flow of unfiltered fluid. To obtain unfiltered fluid without a spray pattern, the operator rotates actuator 98 to the right hand position shown in FIGS. 1B and 4B. However, upon movement of actuator 98 to the right, valve housing 66 disengages from diffuser plate 42 because edge 48 of the diffuser plate abuts against edge 38 of opening 34 and cannot rotate with valve body 66. Thus, as can be seen in FIG. 4B, upon rotation of actuator 98 to the horizontal position, diffuser plate 42 remains in the position shown in FIG. 4B and does not cover the bottom most portion of opening 34. In this position, unfiltered fluid will pass through unfiltered passage 68 from second end 72 and out first end 70. Thus, it should be understood that end 70 of passage 68 is the inlet end in the configuration of 4A and defines the outlet end in the configuration of 4B. Upon movement of actuator 98 from the position shown in FIG. 4B to the closed position of FIG. 1A, at least one of balls 56 will engage in a detent 60 to again rotationally lock diffuser plate 42 relative to valve housing 66.

Figure 6:
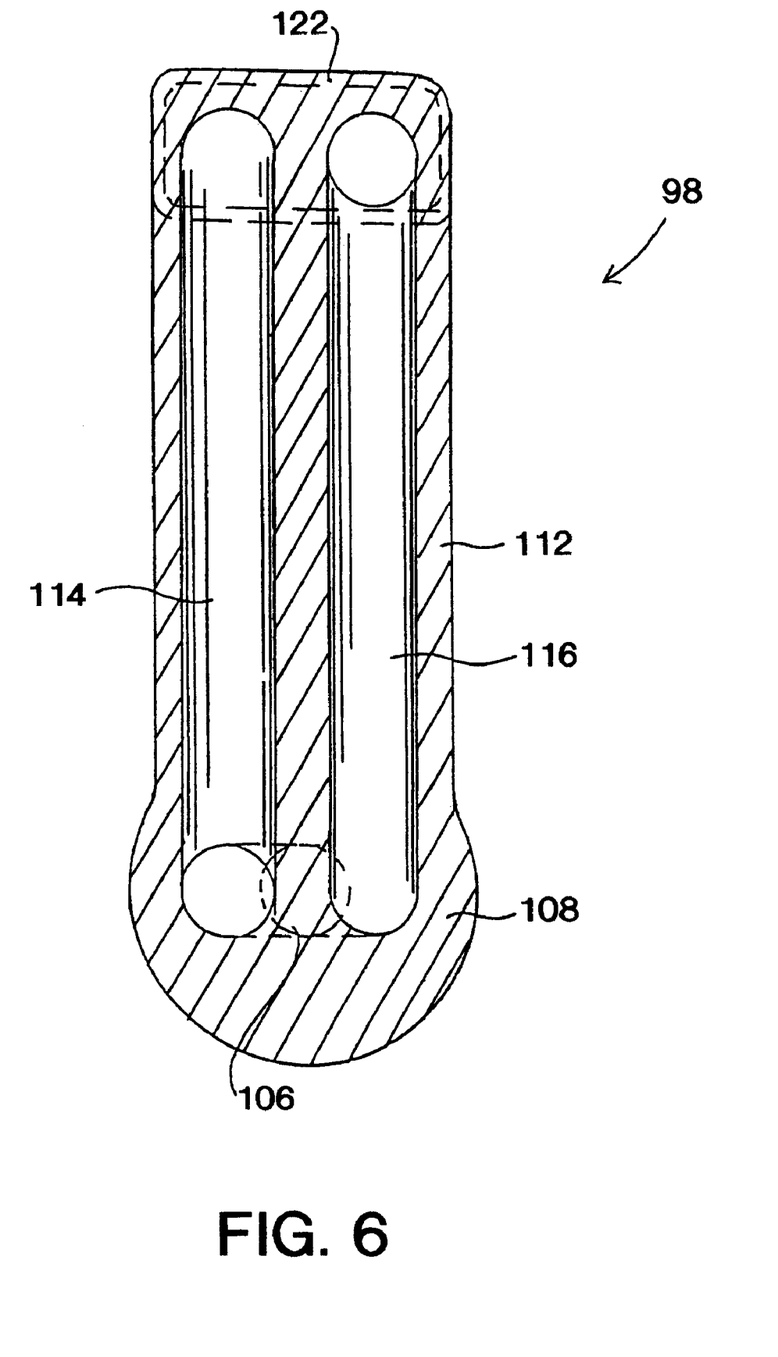
FIG. 6 is a cross-sectional view of a component for the embodiment depicted in FIGS. 1A and 1B taken along line 6—6.
Figure 7:
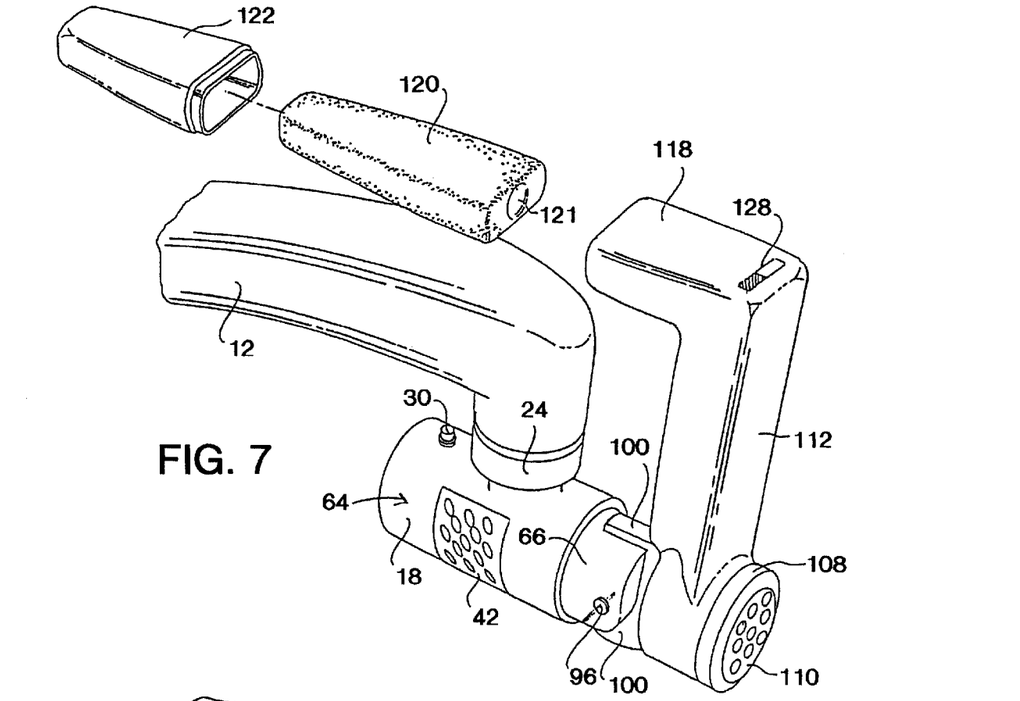
FIG. 7 is a partially exploded view of an embodiment of the present invention.
Figure 8:
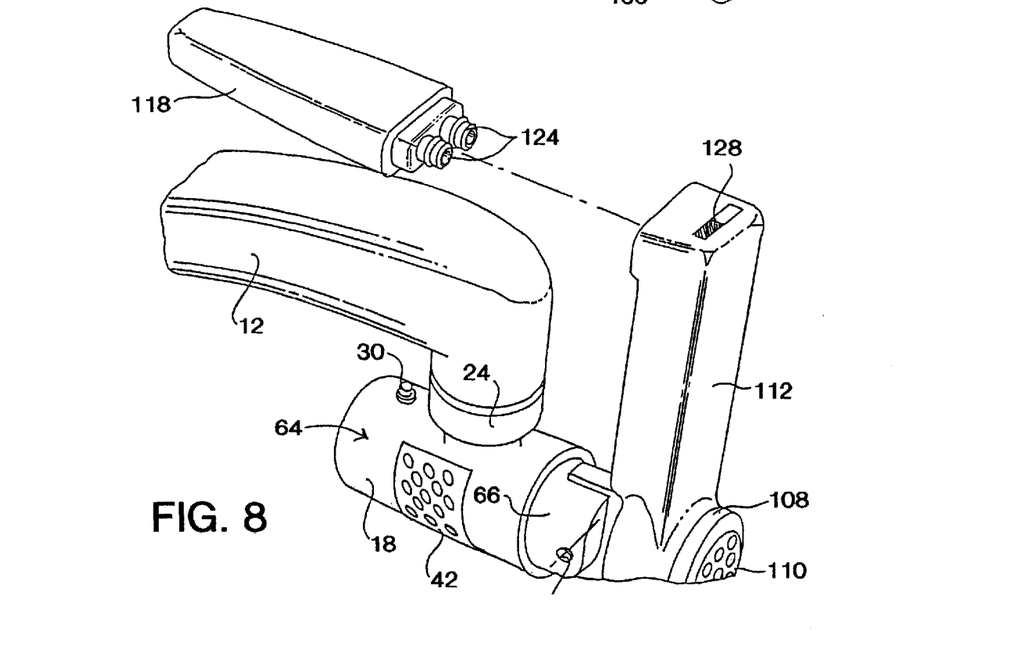
FIG. 8 is a partially exploded view of an embodiment of the present invention.

Actuator 98 is shown in more detail in FIGS. 6–8. Actuator 98 includes an extension, generally 100, that is pivotal within slot 92 defined in valve body 66. In this way, actuator 98 is moveable in the second plane of movement from the position shown in FIG. 1A to the filtered position shown in FIG. 1B. Pins 96 are used to secure extension 100 within slot 92.

Extension 100 includes an arcuate surface 102 on the forward portion thereof. This arcuate surface 102 slides against arcuate surface 94 of valve body 66. Filtered fluid conduits 104a and 104b are defined in extension 100, generally centered longitudinally along extension 100. Conduit section 104a has an inlet 106 that aligns with outlet 78 and sealing device 84 upon pivotal movement of actuator 98 to the dash-line position shown in FIG. 3. Conduit section 104b is angled away from conduit section 104a and communicates with a supply conduit 114 defined in a first portion 112 of actuator 98. A return conduit 116 is also defined in first portion 112. Return conduit 116 defines an outlet 109 for directing filtered fluid out of a dispensing flange section 108 of actuator 98. An orifice for diffuser plate 110 may cover outlet 109.

Actuator 98 includes a filter or filter media to filter the fluid before it is dispensed out of the actuator. FIGS. 7 and 8 show alternate embodiments of the filter arrangement for actuator 98. Referring to FIG. 7, actuator 98 includes first portion 112 and second portion 118 that is at essentially a right angle to first portion 112. Second portion 118 extends back over valve 64 such that spigot 12 is disposed between valve 64 and actuator 98. In this manner, actuator 98 does not extend unnecessarily into the sink area and dispensing system 10 has a relatively compact configuration.

Referring again to FIG. 7, in this embodiment, filter 120 is in a block form with a filter housing 122 that snaps into second portion 118. The filter may be a tapered block, a rectangular block with parallel shoes, a cylindrical block, or a cylinder of pleated or spirally-wrapped filtration media. Unfiltered fluid flows from supply conduit 114 and around the exterior of filter 120 within filter housing 122. The fluid filters through block filter 120 and then exits the filter block through opening 121 which is in communication with return conduit 116. The filtered fluid then exits the actuator as described above.

FIG. 8 depicts an alternative embodiment wherein portion 118 is a filter cartridge enclosing a filter media. The shape of the cartridge is not a limiting factor. The filter cartridge connects to filter portion 112 by means of conventional nub type connectors. One of the nub connectors is in communication with supply conduit 114 and the other nub connection is in communication with return conduit 116. Useful filter devices and media are described in greater detail further on in this description.

Operation of the dispensing system to dispense filtered fluid is particularly illustrated in FIGS. 1B and 3. FIG. 3 illustrates the dispensing system in the closed position of actuator 98. It should be understood that this closed position is common to the second plane of movement and the first plane of movement. In this closed position, it can be seen that inlet end 76 of passage 74 is aligned with inlet 20 of conduit 22. However, outlet end 78 is sealed by arcuate surface 102 of extension 100. Upon pivotal movement of actuator 98 to the dash line position shown in FIG. 3 and the solid line position shown in FIG. 1B, inlet 106 of conduit 104a aligns with outlet 78. Sealing device 84 maintains a water tight seal on arcuate surface 102, but allows surface 102 to slide against surface 94. Upon conduit 104a becoming aligned with portion 82 of passage 74, unfiltered fluid flows into actuator 98 by way of conduits 104a and 104b. The fluid flows up through supply conduit 114, through the filter as discussed above, down return conduit 116, and out of the actuator 98 as also discussed above. To stop the flow of filtered fluid, the operator simply moves actuator 98 in the second plane of movement back to the closed position illustrated in FIG. 1A.

Figures 9A, 9B:
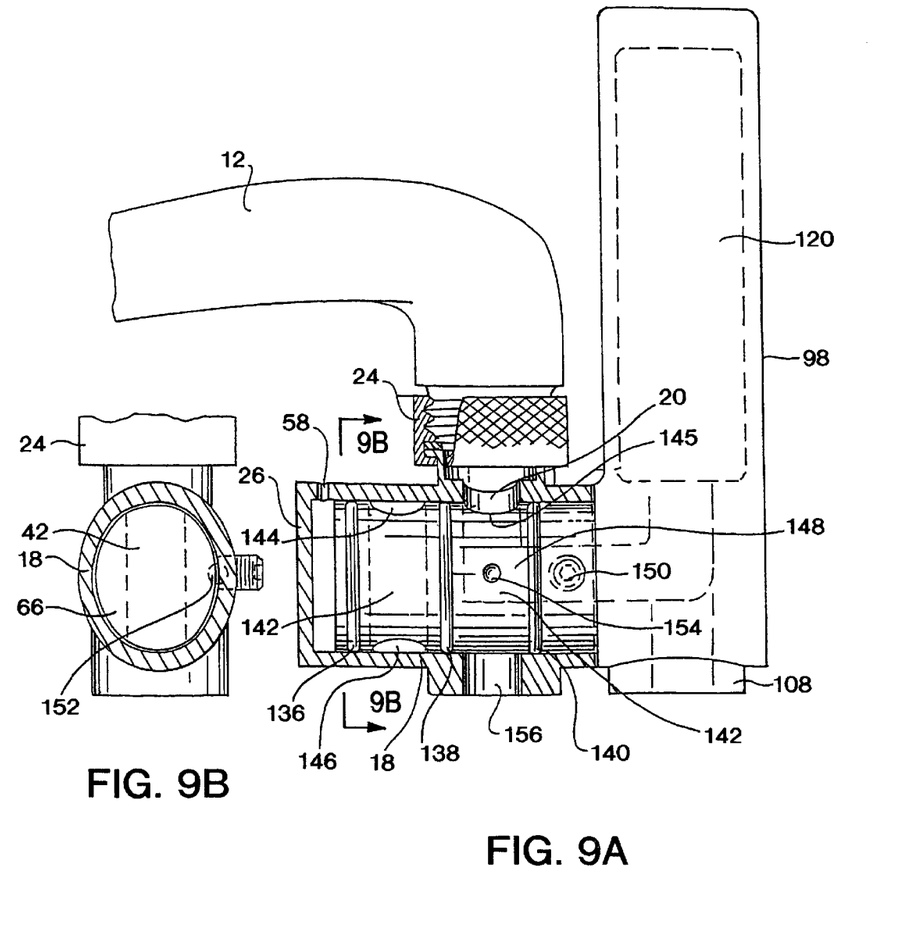
FIG. 9A is a partial cross-sectional view of an embodiment of the present invention.
FIG. 9B is a cross-sectional view of the embodiment of FIG. 9A taken along the lines indicated.

An alternative embodiment of a dispensing system according to the invention is illustrated in FIGS. 9A and 9B. In this embodiment, an actuator 98 and valve body 66 are moveable along a single longitudinal axis between the filtered and unfiltered dispensing positions. Referring to FIG. 9A, valve body 96 includes an unfiltered passage 142 having an inlet 144 and an outlet 146. Seals 136 and 138 are disposed on either side of the unfiltered passage 142. A filtered passage 148 is defined in valve body 66 having an inlet 145. Filtered passage 148 is in communication with the supply conduit defined in actuator 98. A third seal 140 is disposed on the opposite side of inlet 145 from second seal 138. An outlet 156 is defined in the bottom of valve housing 18.

Valve body 66 may be formed integrally with actuator 98 or may comprise a separate component that is engaged with actuator 98. For example, valve body 66 maybe threadedly engaged with actuator 98.

The system is illustrated in FIG. 9A in a filtered fluid dispensing position. In this configuration, inlet 145 is aligned with inlet orifice 20 such that fluid from spigot 12 is directed through passage 148 and into actuator 98. The operation and construction of actuator 98 may be as discussed above with the embodiments of FIGS. 1 through 8. Filtered fluid is then dispensed out of actuator 98 through dispensing flange 108.

To move actuator 98 to an unfiltered fluid dispensing position, the operator simply grasps actuator 98 and pulls the actuator longitudinally outward until inlet 144 of unfiltered passage aligns with inlet orifice 20. In this configuration, fluid from spigot 12 is simply directed straight through unfiltered passage 142 and out the outlet 156 defined in the valve housing. A detent 154 is defined in valve body 66 that is engaged by a spring loaded ball 152 upon proper alignment of inlet 144 with inlet orifice 20. A set screw 150 is used to adjust spring loaded ball 152. The force between ball 152 and detent 154 should be sufficient to prevent valve body 66 from being inadvertently pulled or expelled from valve body 18 without an undue amount of force. A vacuum break 58 is also provided in valve housing 18 to provide air into the valve housing for longitudinal movement of valve body 66.

In order to prevent relative rotational movement between valve body 66 and valve housing 18, it may be desired to configure the components with an oval, elliptical, or other non-round cross-sectional shape, as particularly illustrated in FIG. 9B. In an alternative embodiment, the components may still have a cylindrical or circular cross-section, but some other rotational alignments, structure or mechanism would need to be incorporated between valve housing 18 and valve body 66.

FIGS. 1 through 9 represent only a few of the embodiments of the present invention. As the following examples illustrate, other embodiments may be constructed using the teachings disclosed herein. Various other combinations of the valve and actuator may be constructed such that the actuator is positionable within two planes to select fluid flow, or positionable along a single axis to select fluid flow. The valve may be spherically shaped with grooves and cores forming flow paths and allowing flow selection upon rotation of the valve relative to its housing. The valve and actuator may be constructed to allow for fluid flow control that is simply on-off, or control that is variable such that a range of flow volume may be selected. Similarly, other valve, actuator, and valve housing combinations may be constructed, using the teachings disclosed herein, to provide for the selection of both filtered and unfiltered fluid from a space saving apparatus. With regard to the movement of the actuator, the present invention requires only that fluid control or selection is accomplished by positioning the actuator within two planes that are not coincident, or that the actuator slides or shifts along a single axis. In addition, the present invention may be structured to allow the selection of a spray or stream of either filtered or unfiltered fluid. Accordingly, the present invention is not limited to the embodiments herein disclosed.

A detailed description of filtering materials and media that may be incorporated into the actuator filter system is provided below.

As used herein, the term "charge-modified material" means any material that has an electric charge upon at least some of its surfaces. The charge may be cationic or anionic, and of any magnitude.

As used herein, the term "nonwoven web" means a web or fabric having a structure of individual fibers or threads which are interlaid, but not in an identifiable manner as in a knitted or woven fabric. Nonwoven webs generally may be prepared by methods which are well known to those having ordinary skill in the art. Examples of such processes include, by way of illustration only, meltblowing, coforming, spunbonding, carding and bonding, air-laying, and wet-laying. Meltblowing, coforming, and spunbonding processes are exemplified by the following references, each of which is incorporated herein by reference:

(a) meltblowing references include, by way of example, U.S. Pat. No. 3,016,599 to R. W. Perry, Jr., U.S. Pat. No. 3,704,198 to J. S. Prentice, U.S. Pat. No. 3,755,527 to J. P. Keller et al., U.S. Pat. No. 3,849,241 to R. R. Butin et al., U.S. Pat. No. 3,978,185 to R. R. Butin et al., and U.S. Pat. No. 4,663,220 to T. J. Wisneski et al. See, also, V. A. Wente, "Superfine Thermoplastic Fibers", *Industrial and Engineering Chemistry*, Vol. 48, No. 8, pp. 1342–1346 (1956); V. A. Wente et al., "Manufacture of Superfine Organic Fibers", Navy Research Laboratory, Washington, D.C., NRL Report 4364 (111437), dated May 25, 1954, United States Department of Commerce, Office of Technical Services; and Robert R. Butin and Dwight T. Lohkamp, "Melt Blowing-A One-Step Web Process for New Nonwoven Products", *Journal of the Technical Asso-* ciation of the Pulp and Paper Industry, Vol. 56, No.4, pp. 74–77 (1973);

(b) coforming references include U.S. Pat. No. 4,100,324 to R. A. Anderson et al. and U.S. Pat. No. 4,118,531 to E. R. Hauser; and (c) spunbonding references include, among others, U.S. Pat. No. 3,341,394 to Kinney, U.S. Pat. No. 3,655,862 to Dorschner et al., U.S. Pat. No. 3,692,618 to Dorschner et al., U.S. Pat. No. 3,705,068 to Dobo et al., U.S. Pat. No. 3,802,817 to Matsuki et al., U.S. Pat. No. 3,853,651 to Porte, U.S. Pat. No. 4,064,605 to Akiyama et al., U.S. Pat. No. 4,091,140 to Harmon, U.S. Pat. No. 4,100,319 to Schwartz, U.S. Pat. No. 4,340,563 to Appel and Morman, U.S. Pat. No. 4,405,297 to Appel and Morman, U.S. Pat. No. 4,434,204 to Hartman et al., U.S. Pat. No. 4,627,811 to Greiser and Wagner, and U.S. Pat. No. 4,644,045 to Fowells.

A "nonwoven charge-modified microfiber glass web" may be prepared from a fibrous web which incorporates glass fibers having a cationically-charged coating thereon. Generally, such microfibers would be glass fibers having an average diameter of about 10 microns or less. The coating includes a functionalized cationic polymer which has been crosslinked by heat; in other words, the functionalized cationic polymer has been crosslinked by heat after being coated onto the glass fibers. Such a fibrous filter is prepared by a method which involves providing a fibrous filter which includes glass fibers, passing a solution of a functionalized cationic polymer crosslinkable by heat through the fibrous filter under conditions sufficient to substantially coat the fibers with the functionalized cationic polymer, and treating the resulting coated fibrous filter with heat at a temperature and for a time sufficient to crosslink the functionalized cationic polymer present on the glass fibers. The functionalized cationic polymer may be an epichlorohydrin-functionalized polyamine or an epichlorohydrin-functionalized polyamido-amine.

In general, when used as a filter media, a "charge-modified microfiber glass web" will contain at least about 50 percent by weight of glass fibers, based on the weight of all fibers present in the filter media. In some embodiments, essentially 100 percent of the fibers will be glass fibers. When other fibers are present, however, they generally will be cellulosic fibers, fibers prepared from synthetic thermoplastic polymers, or mixtures thereof.

As used herein, the terms "cationically-charged" in reference to a coating on a glass fiber and "cationic" in reference to the functionalized polymer mean the presence in the respective coating and polymer of a plurality of positively-charged groups. Thus, the terms "cationically-charged" and "positively-charged" are synonymous. Such positively-charged groups typically will include a plurality of quaternary ammonium groups, but they are not necessarily limited thereto.

The term "functionalized" is used herein to mean the presence in the cationic polymer of a plurality of functional groups, other than the cationic groups, which are capable of crosslinking when subjected to heat. Thus, the functional groups are thermally crosslinkable groups. Examples of such functional groups include epoxy, ethylenimino, and episulfido. These functional groups readily react with other groups typically present in the cationic polymer. The other groups typically have at least one reactive hydrogen atom and are exemplified by amino, hydroxy, and thiol groups. It may be noted that the reaction of a functional group with another group often generates still other groups which are capable of reacting with functional groups. For example, the reaction of an epoxy group with an amino group results in the formation of a β-hydroxyamino group.

Thus, the term "functionalized cationic polymer" is meant to include any polymer which contains a plurality of positively charged groups and a plurality of other functional groups which are capable of being crosslinked by the application of heat. Particularly useful examples of such polymers are epichlorohydrin-functionalized polyamines and epichlorohydrin-functionalized polyamido-amines. Both types of polymers are exemplified by the Kymene® resins which are available from Hercules Inc., Wilmington, Del. Other suitable materials include cationically-modified starches, such as RediBond, from National Starch.

As used herein, the term "thermally crosslinked" means the coating of the functionalized cationic polymer has been heated at a temperature and for a time sufficient to crosslink the above-noted functional groups. Heating temperatures typically may vary from about 50° C. to about 150° C. Heating times in general are a function of temperature and the type of functional groups present in the cationic polymer. For example, heating times may vary from less than a minute to about 60 minutes or more. Heating times and temperatures are also determined by the amount of solution in the web which must be evaporated.

As discussed briefly above, a nonwoven charge-modified meltblown web may consist of hydrophobic polymer fibers, amphiphilic macromolecules adsorbed onto at least a portion of the surfaces of the hydrophobic polymer fibers, and a crosslinkable, functionalized cationic polymer associated with at least a portion of the amphiphilic macromolecules, in which the functionalized cationic polymer has been crosslinked. Crosslinking may be achieved through the use of a chemical crosslinking agent or by the application of heat. Desirably, thermal crosslinking, i.e., the application of heat, will be employed. In general, the amphiphilic macromolecules may be of one or more of the following types: proteins, poly(vinyl alcohol), monosaccharides, disaccharides, polysaccharides, polyhydroxy compounds, polyamines, polylactones, and the like. Desirably, the amphiphilic macromolecules will be amphiphilic protein macromolecules, such as globular protein or random coil protein macromolecules. For example, the amphiphilic protein macromolecules may be milk protein macromolecules. The functionalized cationic polymer typically may be any polymer which contains a plurality of positively-charged groups and a plurality of other functional groups which are capable of being crosslinked by, for example, chemical crosslinking agents or the application of heat. Particularly useful examples of such polymers are epichlorohydrin-functionalized polyamines and epichlorohydrin-functionalized polyamido-amines. Other suitable materials include cationically modified starches.

The nonwoven charge-modified meltblown web may be prepared by a method which involves providing a fibrous meltblown filter media which includes hydrophobic polymer fibers, passing a solution containing amphiphilic macromolecules through the fibrous filter under shear stress conditions so that at least a portion of the amphiphilic macromolecules are adsorbed onto at least some of the hydrophobic polymer fibers to give an amphiphilic macromolecule-coated fibrous web, passing a solution of a crosslinkable, functionalized cationic polymer through the amphiphilic macromolecule-coated fibrous web under conditions sufficient to incorporate the functionalized cationic polymer onto at least a portion of the amphiphilic macromolecules to give a functionalized cationic polymer-coated fibrous web in which the functionalized cationic polymer is associated with at least a portion of the amphiphilic macromolecules, and treating the resulting coated fibrous filter with a chemical crosslinking agent or heat. Desirably, the coated fibrous filter will be treated with heat at a temperature and for a time sufficient to crosslink the functionalized cationic polymer.

It is to be understood that changes and variations may be made by those of ordinary skill in the art without departing from the spirit or the scope of the present invention, which is set forth in the following claims.

What is claimed is:

1. A fluid dispensing system, comprising:
    a valve housing defining an inlet through which unfiltered fluid may be supplied to said dispensing system;
    said valve housing also defining an unfiltered fluid outlet through which unfiltered fluid may exit said dispensing system;
    a valve actuator defining a filtered fluid outlet through which filtered fluid may exit said dispensing system;
    a selectively positionable valve body movably disposed in said valve housing including a first fluid passage providing fluid communication between said inlet and said unfiltered fluid outlet in an unfiltered dispensing position, and a second fluid passage providing fluid communication between said inlet and said valve actuator in a filtered dispensing position;
    said valve actuator having a portion mechanically connected with said valve body, wherein said valve actuator is positionable to move said valve body to said unfiltered dispensing position and to said filtered dispensing position, whereby a flow of filtered or unfiltered fluid from said dispensing system is selected by positioning said valve actuator between said filtered and unfiltered dispensing positions;
    a filter located within said valve actuator, said filter being in fluid communication with said valve body second fluid passage in said filtered dispensing position of said valve actuator so that said unfiltered fluid flows from said second fluid passage and into said valve actuator, is filtered within said valve actuator, and flows out of said dispensing system through said filtered fluid outlet in said valve actuator; and
    wherein mechanical connection of said portion of said valve actuator permits movement of said valve actuator in a first plane from a closed position to said unfiltered dispensing position, and permits movement in a separate second plane transverse to said first plane from said closed position to said filtered dispensing position.

2. A fluid dispensing system as in claim 1, wherein said valve body is rotatable within said valve housing.

3. A fluid dispensing system as in claim 2, wherein said portion of said valve actuator is pivotally mounted to said valve body so as to pivot in said second plane relative to said valve body, and said portion of said valve actuator being non-rotatably connected to said valve body so that rotational movement of said valve actuator in said first plane rotates said valve body within said valve housing.

4. A fluid dispensing system as in claim 3, wherein upon rotational movement of said actuator in said first plane from said closed position to a first unfiltered dispensing position, a first end of said first fluid passage is aligned with said inlet and a second opposite end of said first fluid passage dispenses unfiltered fluid out of said unfiltered fluid outlet in a first unfiltered flow mode.

5. A fluid dispensing system as in claim 4, further comprising a movable diffuser rotationally engaged by said valve body so as to move across said unfiltered fluid outlet upon movement of said actuator to said first unfiltered dispensing position such that said first unfiltered flow mode is a diffused flow mode.

6. A fluid dispensing system as in claim 1, wherein said first plane and said second plane are perpendicular.

7. A fluid dispensing system as in claim 6, wherein said inlet of said valve housing is connectable to a spigot and, in said closed position, said actuator is aligned with a centerline of the spigot, said actuator moveable in said first plane generally perpendicular to the spigot, and movable in said second plane generally parallel to the centerline of the spigot.

8. A fluid dispensing system as in claim 1, wherein said valve actuator further comprises a housing having a first part and a second part, said first part connected to said portion of said actuator mechanically connected to said valve body and said second part being resealably connected to said first part, and said second part containing said filter.

9. A fluid dispensing system as in claim 1, wherein said filter is selected from the group consisting of a tapered block, a rectangular block with parallel shoes, a cylindrical block, a cylinder of pleated filtration media, and a cylinder of spirally-wrapped filtration media.

10. A fluid dispensing system as in claim 1, wherein said filter comprises a charge-modified material.

11. A fluid dispensing system, comprising:
    a valve housing defining an inlet through which unfiltered fluid may be supplied to said dispensing system;
    said valve housing also defining an unfiltered fluid outlet through which unfiltered fluid may exit said dispensing system;
    a valve actuator defining a filtered fluid outlet through which filtered fluid may exit said dispensing system;
    a selectively positionable valve body movably disposed in said valve housing including a first fluid passage providing fluid communication between said inlet and said unfiltered fluid outlet in an unfiltered dispensing position, and a second fluid passage providing fluid communication between said inlet and said valve actuator in a filtered dispensing position;
    said valve actuator comprising a portion mechanically connected with said valve body, wherein said valve actuator is positionable to move said valve body to said unfiltered dispensing position and to said filtered dispensing position, whereby a flow of filtered or unfiltered fluid from said dispensing system is selected by positioning said valve actuator between said filtered and unfiltered dispensing positions;
    a filter located within said valve actuator, said filter being in fluid communication with said valve body second fluid passage in said filtered dispensing position of said valve actuator so that said unfiltered fluid flows from said second fluid passage and into said valve actuator, is filtered within said valve actuator, and flows out of said dispensing system through said filtered fluid outlet in said valve actuator; and
    wherein mechanical connection of said portion of said valve actuator permits movement of said valve actuator in a first plane from a closed position of said valve actuator to said unfiltered dispensing position, and permits movement in a separate second plane from said closed position to said filtered dispensing position; and
    said valve actuator further comprising a first portion attached to said portion of said valve actuator mechanically connected with said valve body and in fluid communication with said valve body, said first portion extending generally upwardly with respect to said portion of said valve actuator mechanically connected with said valve body, and a second portion extending from said first portion generally back over said valve body in said closed position of said valve actuator.

12. A fluid dispensing system as in claim 11, wherein said valve actuator comprises a housing that is L-shaped, said housing formed by said first and second portions such that when said dispensing system is attached to a spigot, said second portion extends back over the spigot in said closed position of said valve actuator.

13. A fluid dispensing system, comprising:

a valve housing defining an inlet through which unfiltered fluid may be supplied to said dispensing system;

said valve housing also defining an unfiltered fluid outlet through which unfiltered fluid may exit said dispensing system;

a valve actuator defining a filtered fluid outlet through which filtered fluid may exit said dispensing system;

a selectively positionable valve body movably disposed in said valve housing including a first fluid passage providing fluid communication between said inlet and said unfiltered fluid outlet in an unfiltered dispensing position, and a second fluid passage providing fluid communication between said inlet and said valve actuator in a filtered dispensing position;

said valve actuator having a portion mechanically connected with said valve body, wherein said valve actuator is positionable to move said valve body to said unfiltered dispensing position and to said filtered dispensing position, whereby a flow of filtered or unfiltered fluid from said dispensing system is selected by positioning said valve actuator between said filtered and unfiltered dispensing positions;

a filter located within said valve actuator, said filter being in fluid communication with said valve body second fluid passage in said filtered dispensing position of said valve actuator so that said unfiltered fluid flows from said second fluid passage and into said valve actuator, is filtered within said valve actuator, and flows out of said dispensing system through said filtered fluid outlet in said valve actuator; and wherein mechanical connection of said portion of said valve actuator permits movement of said valve actuator in a first plane from a closed position to said unfiltered dispensing position, and permits movement in a separate second plane from a closed position to said filtered dispensing position, and wherein said closed position of said valve actuator is common to both said first and second planes.

14. A fluid dispensing system, comprising:

a valve housing defining an inlet through which unfiltered fluid may be supplied to said dispensing system;

said valve housing also defining an unfiltered fluid outlet through which unfiltered fluid may exit said dispensing system;

a valve actuator defining a filtered fluid outlet through which filtered fluid may exit said dispensing system;

a selectively positionable valve body movably disposed in said valve housing including a first fluid passage providing fluid communication between said inlet and said unfiltered fluid outlet in an unfiltered dispensing position, and a second fluid passage providing fluid communication between said inlet and said valve actuator in a filtered dispensing position;

said valve actuator having a portion mechanically connected with said valve body, wherein said valve actuator is positionable to move said valve body to said unfiltered dispensing position and to said filtered dispensing position, whereby a flow of filtered or unfiltered fluid from said dispensing system is selected by positioning said valve actuator between said filtered and unfiltered dispensing positions;

a filter located within said valve actuator, said filter being in fluid communication with said valve body second fluid passage in said filtered dispensing position of said valve actuator so that said unfiltered fluid flows from said second fluid passage and into said valve actuator, is filtered within said valve actuator, and flows out of said dispensing system through said filtered fluid outlet in said valve actuator; and wherein mechanical connection of said portion of said valve actuator permits movement of said valve actuator in a first plane from a closed position to said unfiltered dispensing position, and permits movement in a separate second plane from a closed position to said filtered dispensing position, and wherein said valve body is rotatable within said valve housing, and said portion of said valve actuator is pivotally mounted to said valve body so as to pivot in said second plane relative to said valve body, and said portion of said valve actuator being non-rotatably connected to said valve body so that rotational movement of said valve actuator in said first plane rotates said valve body within said valve housing, and wherein said closed position of said valve actuator is common to both said first and second planes.

15. A fluid dispensing system as in claim 14, wherein said actuator comprises a fluid inlet that is misaligned with said second fluid passage in said closed position of said actuator, and is aligned with said second fluid passage upon movement of said actuator in said second plane to said filtered dispensing position.

16. A fluid dispensing system, comprising:

a valve housing defining an inlet through which unfiltered fluid may be supplied to said dispensing system;

said valve housing also defining an unfiltered fluid outlet through which unfiltered fluid may exit said dispensing system;

a valve actuator defining a filtered fluid outlet through which filtered fluid may exit said dispensing system;

a selectively positionable valve body movably disposed in said valve housing including a first fluid passage providing fluid communication between said inlet and said unfiltered fluid outlet in an unfiltered dispensing position, and a second fluid passage providing fluid communication between said inlet and said valve actuator in a filtered dispensing position;

said valve actuator having a portion mechanically connected with said valve body, wherein said valve actuator is positionable to move said valve body to said unfiltered dispensing position and to said filtered dispensing position, whereby a flow of filtered or unfiltered fluid from said dispensing system is selected by positioning said valve actuator between said filtered and unfiltered dispensing positions;

a filter located within said valve actuator, said filter being in fluid communication with said valve body second fluid passage in said filtered dispensing position of said valve actuator so that said unfiltered fluid flows from said second fluid passage and into said valve actuator, is filtered within said valve actuator, and flows out of said dispensing system through said filtered fluid outlet in said valve actuator; and wherein mechanical connection of said portion of said valve actuator permits movement of said valve actuator in a first plane from a closed position to said unfiltered dispensing position, and permits movement in a separate second plane from said closed position to said filtered dispensing position, and wherein said valve body is rotatable within said valve housing, and said portion of said valve actuator is pivotally mounted to said valve body so as to pivot in said second plane relative to said valve body, and said portion of said valve actuator being non-rotatably connected to said valve body so that rotational movement of said valve actuator in said first plane rotates said valve body within said valve housing, wherein upon rotational movement of said valve actuator in said first plane from said closed position to a first unfiltered dispensing position, a first end of said first fluid passage is aligned with said inlet and a second opposite end of said first fluid passage dispenses unfiltered fluid out of said unfiltered fluid outlet in a first unfiltered flow mode; and said valve housing further comprising a movable diffuser rotationally engaged by said valve body so as to move across said unfiltered fluid outlet upon movement of said valve actuator to said first unfiltered dispensing position such that said first unfiltered flow mode is a diffused flow mode, wherein said valve actuator is rotationally movable in said first plane to a second unfiltered dispensing position for a second unfiltered flow mode, said diffuser rotationally disengaged from said valve body upon movement of said valve actuator to said second unfiltered dispensing position so as not to cover said unfiltered fluid outlet, said second unfiltered flow mode being a non-diffused flow mode.

17. A fluid dispensing system as in claim 16, wherein said first fluid passage comprises a straight passage and said second unfiltered dispensing position is generally opposite from said first unfiltered dispensing position, said second end of said first fluid passage thereby aligning with said inlet in said second unfiltered dispensing position of said actuator.

18. A fluid dispensing system, comprising:
a valve housing defining an inlet through which unfiltered fluid may be supplied to said dispensing system;
said valve housing also defining an unfiltered fluid outlet through which unfiltered fluid may exit said dispensing system;
a valve actuator defining a filtered fluid outlet through which filtered fluid may exit said dispensing system;
a selectively positionable valve body movably disposed in said valve housing including a first fluid passage providing fluid communication between said inlet and said unfiltered fluid outlet in an unfiltered dispensing position, and a second fluid passage providing fluid communication between said inlet and said valve actuator in a filtered dispensing position;
said actuator mechanically connected with said valve body, wherein said actuator is positionable to move said valve body to said unfiltered dispensing position and to said filtered dispensing position, whereby a flow of filtered or unfiltered fluid from said dispensing system is selected by positioning said actuator between said filtered and unfiltered dispensing positions;
a filter located within said actuator, said filter being in fluid communication with said valve body second fluid passage in said filtered dispensing position of said actuator so that said unfiltered fluid flows from said second fluid passage and into said actuator, is filtered within said actuator, and flows out of said filtered fluid outlet in said actuator and dispensing system; and
wherein said actuator is movable along a single generally straight axis without rotating between said filtered and unfiltered dispensing positions.

19. A dispensing system as in claim 18, wherein said valve body is movable longitudinally within said valve housing, said second fluid passage has an end aligned with said inlet in said filtered dispensing position to dispense fluid into said actuator, said first fluid passage in said unfiltered dispensing position has an end aligned with said inlet and an opposite end aligned with said unfiltered fluid outlet.

20. A fluid dispensing system, comprising:
a valve housing defining an inlet through which unfiltered fluid may be supplied to said dispensing system;
said valve housing also defining an unfiltered fluid outlet through which unfiltered fluid may exit said dispensing system;
a valve actuator defining a filtered fluid outlet through which filtered fluid may exit said dispensing system;
a selectively positionable valve body movably disposed in said valve housing including a first fluid passage providing fluid communication between said inlet and said unfiltered fluid outlet in an unfiltered dispensing position, and a second fluid passage providing fluid communication between said inlet and said valve actuator in a filtered dispensing position;
said actuator mechanically connected with said valve body, wherein said actuator is positionable to move said valve body to said unfiltered dispensing position and to said filtered dispensing position, whereby a flow of filtered or unfiltered fluid from said dispensing system is selected by positioning said actuator between said filtered and unfiltered dispensing positions;
a filter located within said actuator, said filter being in fluid communication with said valve body second fluid passage in said filtered dispensing position of said actuator so that said unfiltered fluid flows from said second fluid passage and into said actuator, is filtered within said actuator, and flows out of said filtered fluid outlet in said actuator and dispensing system; and
wherein said actuator is movable along a single axis between said filtered and unfiltered dispensing positions, wherein said actuator comprises a first portion in communication with said valve body that extends generally upwardly, and a second portion extending from said first portion generally back over said valve body.

21. A fluid dispensing system as in claim 20, wherein said actuator comprises a housing that is L-shaped such that when attached to a spigot, said second portion extends back over the spigot.

22. A fluid dispensing system, comprising:
a valve housing defining an inlet through which unfiltered fluid may be supplied to said dispensing system;
said valve housing also defining an unfiltered fluid outlet through which unfiltered fluid may exit said dispensing system;
a valve actuator defining a filtered fluid outlet through which filtered fluid may exit said dispensing system;
a selectively positionable valve body movably disposed in said valve housing including a first fluid passage providing fluid communication between said inlet and said unfiltered fluid outlet in an unfiltered dispensing position, and a second fluid passage providing fluid communication between said inlet and said valve actuator in a filtered dispensing position;

said valve actuator having a portion mechanically connected with said valve body, wherein said valve actuator is positionable to move said valve body to said unfiltered dispensing position and to said filtered dispensing position, whereby a flow of filtered or unfiltered fluid from said dispensing system is selected by positioning said valve actuator between said filtered and unfiltered dispensing positions;

a filter located within said valve actuator, said filter being in fluid communication with said valve body second fluid passage in said filtered dispensing position of said valve actuator so that said unfiltered fluid flows from said second fluid passage and into said valve actuator, is filtered within said valve actuator, and flows out of said dispensing system through said filtered fluid outlet in said valve actuator; and wherein mechanical connection of said portion of said valve actuator permits movement of said valve actuator in a first plane to said unfiltered dispensing position, and permits movement in a separate second plane transverse to said first plane to said filtered dispensing position.

23. A fluid dispensing system as in claim 20, wherein said valve actuator has a first portion attached to said valve actuator mechanically connected to said valve body and in communication with said valve body, and said first portion extending generally upwardly with respect to said portion of said actuator mechanically connected to said valve body, and a second portion extending from said first portion generally back over said valve body in a closed position of said valve actuator.

24. A fluid dispensing system as in claim 23, wherein said valve actuator comprises a housing that is L-shaped, said housing formed by said first and second portions such that when said dispensing system is attached to a spigot, said second portion extends back over the spigot in said closed position of said valve actuator.

25. A fluid dispensing system as in claim 22, wherein said first plane and said second plane are perpendicular.

26. A fluid dispensing system as in claim 22, wherein said actuator is positionable to a closed position that is common to both said first and second planes.

* * * * *